(12) United States Patent
Infante

(10) Patent No.: US 10,758,087 B1
(45) Date of Patent: Sep. 1, 2020

(54) MULTI-PURPOSE CUTTING BOARD

(71) Applicant: Magnefuse, LLC, Miami, FL (US)

(72) Inventor: Alfredo Infante, Miami, FL (US)

( * ) Notice: Subject to any disclaimer, the term of this patent is extended or adjusted under 35 U.S.C. 154(b) by 122 days.

(21) Appl. No.: 15/979,629

(22) Filed: May 15, 2018

Related U.S. Application Data

(60) Provisional application No. 62/482,738, filed on Apr. 7, 2017.

(51) Int. Cl.
| | | |
|---|---|---|
| *A47J 47/00* | (2006.01) | |
| *A47J 47/16* | (2006.01) | |
| *A47B 31/00* | (2006.01) | |
| *A47J 47/02* | (2006.01) | |
| *A47B 31/04* | (2006.01) | |

(52) U.S. Cl.
CPC ............. *A47J 47/005* (2013.01); *A47J 47/16* (2013.01); *A47B 31/001* (2013.01); *A47B 31/04* (2013.01); *A47B 2031/003* (2013.01); *A47J 47/02* (2013.01)

(58) Field of Classification Search
CPC .... A47J 47/005; A47J 47/16; A47J 47/02–12; A47J 47/00; A47B 2031/003; A47B 31/00; A47B 31/001; A47B 31/04; A47B 33/00; A47B 88/00; A47B 88/40
USPC ......... 269/289 R, 302.1; 108/24, 25, 26, 162
See application file for complete search history.

(56) References Cited

U.S. PATENT DOCUMENTS

| | | | | |
|---|---|---|---|---|
| 5,363,755 A * | 11/1994 | Liang | ..................... | A47B 77/02 241/273.2 |
| 5,382,009 A * | 1/1995 | Mertz | ..................... | A45C 15/00 269/16 |
| 5,417,080 A * | 5/1995 | Bishop | ..................... | A23B 7/00 312/402 |
| 5,865,105 A * | 2/1999 | Pepelanov | ............ | A47J 47/005 269/15 |
| 6,651,970 B2 * | 11/2003 | Scott | ..................... | A47J 47/005 269/13 |
| 6,971,644 B1 * | 12/2005 | Kennedy | ............... | A47J 47/005 269/289 R |
| 7,252,255 B2 * | 8/2007 | Cornfield | .............. | A47J 47/005 241/274 |
| 7,422,201 B2 * | 9/2008 | Pearl | ..................... | A47J 47/005 269/289 R |
| 7,530,558 B2 * | 5/2009 | Casale | ................... | A47J 47/005 269/13 |
| 8,220,789 B2 * | 7/2012 | Pourounidis | .......... | A47J 47/005 269/289 R |
| 8,317,176 B2 * | 11/2012 | Ferone | ................... | A47J 47/005 269/289 R |

(Continued)

*Primary Examiner* — Orlando E Aviles
*Assistant Examiner* — Robert F Neibaur
(74) *Attorney, Agent, or Firm* — Sanchelima & Associates, P.A.; Christian Sanchelima; Jesus Sanchelima

(57) ABSTRACT

A multi-purpose, foldable cutting board that can be used to store knives along at least one of its side walls while including a plurality of compartments housed within the cutting board that can be used to store or transport cut foods. Additionally, the compartments can be covered using complementing compartment covers that close the compartments using fastening means such as magnets. The compartments can be slid in and out of the cutting board so that a user can access the cut foods or the foods can be transported within the cutting board. Also, the compartments can include a lip or similar funneling element to provide for easy transfer of the cut foods without spillage.

17 Claims, 2 Drawing Sheets

(56) References Cited

U.S. PATENT DOCUMENTS

| | | | | |
|---|---|---|---|---|
| 8,328,175 B2* | 12/2012 | O'Shea | ............... | A21C 9/08 |
| | | | | 269/289 R |
| 8,720,879 B1* | 5/2014 | Schrimper | ............... | A47J 47/00 |
| | | | | 269/16 |
| 10,206,540 B2* | 2/2019 | Kamensky | ............... | A47J 47/005 |
| 2006/0085989 A1* | 4/2006 | Kuan Huo | ............... | A47J 47/005 |
| | | | | 30/151 |
| 2014/0097566 A1* | 4/2014 | Rivera | ............... | A47J 47/16 |
| | | | | 269/16 |
| 2016/0331185 A1* | 11/2016 | Anderson | ............... | A47J 47/005 |
| 2018/0206681 A1* | 7/2018 | Al Hussein | ............... | B26B 29/025 |

\* cited by examiner

MULTI-PURPOSE CUTTING BOARD

RELATED APPLICATIONS

The present invention claims priority and benefit of U.S. provisional application 62/482,738 filed on Apr. 7, 2017 and is herein incorporated by reference

BACKGROUND OF THE INVENTION

Field of the Invention

The present invention relates to multi-purpose cutting board and, more particularly, to a multi-purpose cutting board having a plurality of compartments that can be removed and used to collect diced, chopped, or minced food and allow for easy transportation and transfer of same. The present invention also includes slots to store a plurality of knives along its perimeter.

Description of the Related Art

Several designs for cutting boards have been designed in the past. None of them, however, include the novel and non-obvious elements of removable compartments that include an opening to funnel cut foods to a desired location. In addition, none of the cutting boards in the prior art simultaneously include folding means to fold the board in half and allow it to be transported as a briefcase or be stood up as a knife block.

Additionally, none of the existing cutting boards include compartment covers that define the cutting board's surface so that they can be easily removed and allow the cut food to fall into the compartments. Also, none of the cutting boards in the current state of the art include the use of magnets to affix the compartment covers and/or compartments themselves to the cutting board.

Other documents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a multi-purpose cutting board that allows for multiple cut foods to be transferred to compartments that provide for easy transfer to other surfaces.

It is another object of this invention to provide a multi-purpose cutting board that is foldable.

It is still another object of the present invention to provide a multi-purpose cutting board that can store and transport a plurality of knives.

It is still another object of the present invention to provide a multi-purpose cutting board that includes multiple covers over the compartments that help define the cutting surface of the cutting board.

It is another object of the present invention to provide a cutting board that is made at least partially of plastic, composite, and/or wood and further having its compartment covers made of a transparent material so that a a user can see the foods within the compartments.

It is yet another object of this invention to provide such a cutting board that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
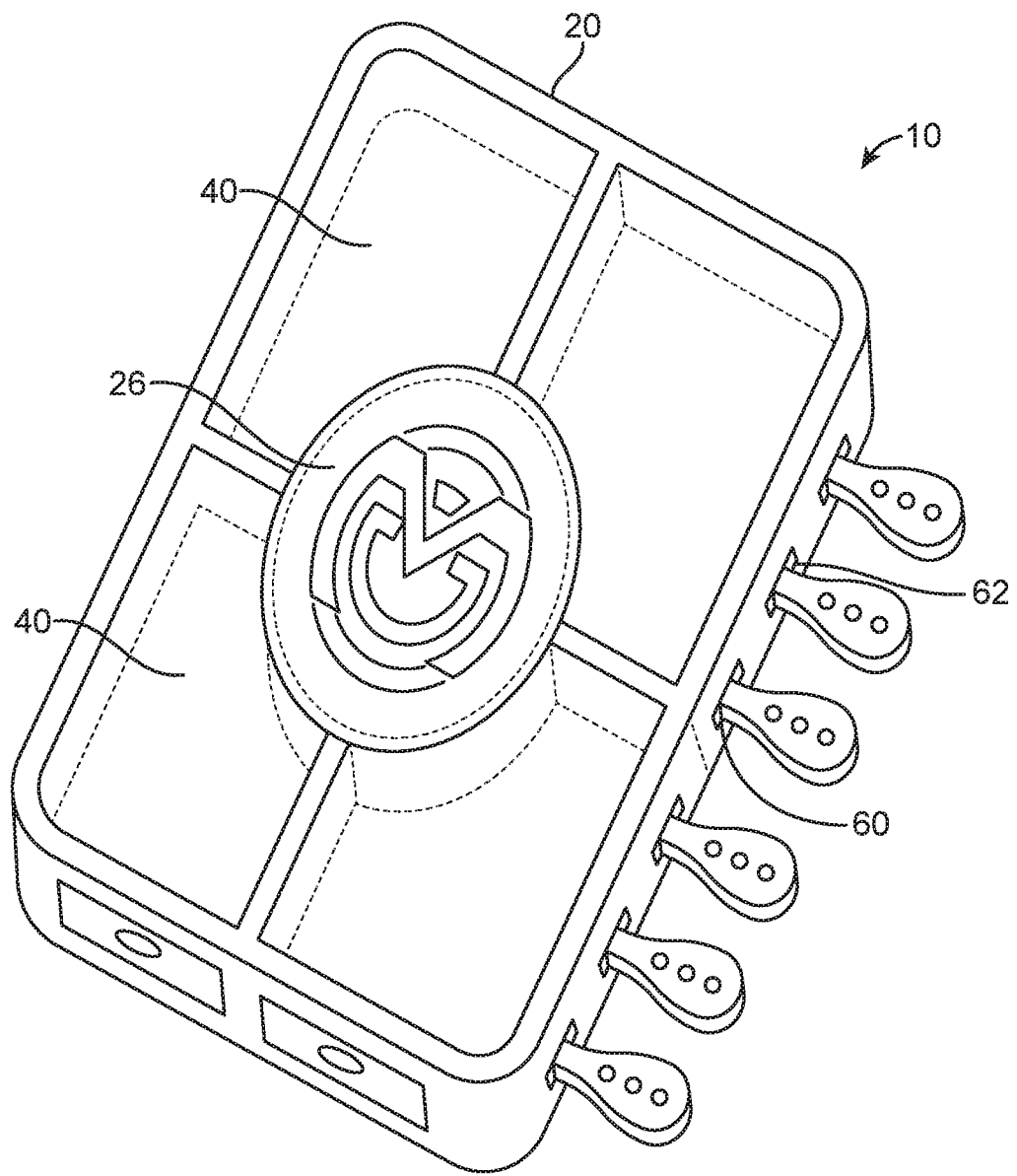
FIG. 1 represents an isometric top view of the present invention wherein a plurality of knives can be seen stored within one of the side walls of the cutting board. Additionally, various compartments including handles can be seen along at least one of the remaining side walls.

Referring now to the drawings, where the present invention is generally referred to with numeral 10, it can be observed that it basically includes a cutting board assembly 20, compartment assembly 40, and knife assembly 60.

In one embodiment, cutting board assembly 20 can include hinges or similar means that allow the cutting board member 22 to fold along a predetermined point such as the center of the board. Cutting board 22 can be folded inwardly or outwardly. Cutting board 22 can be made of a combination of one or more of the following materials: plastic, metal, aluminum, carbon fiber, wood, composite or any other suitable material.

Figure 2:
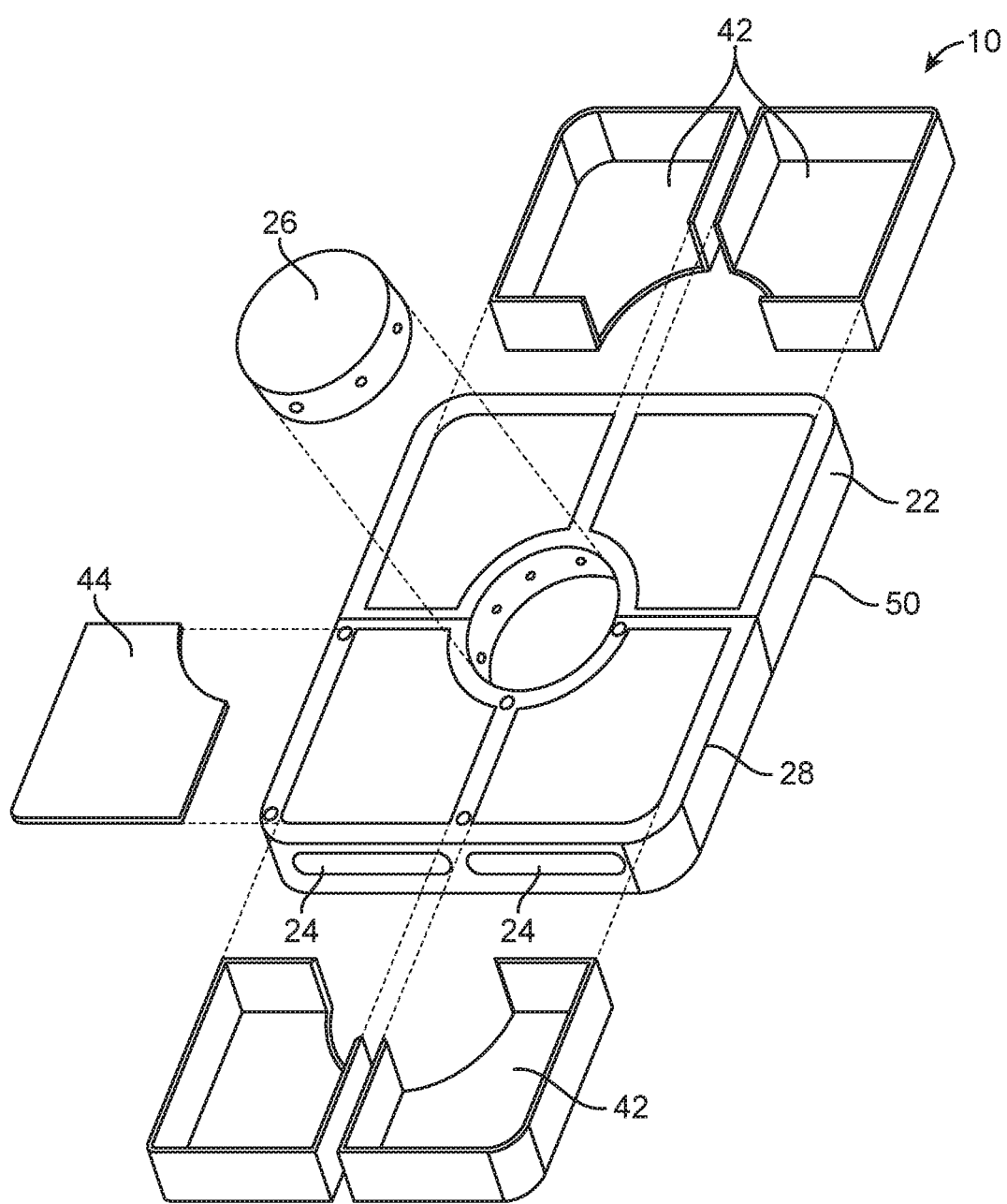
FIG. 2 shows an exploded view of the present invention wherein the various compartments and their corresponding covers are removed from the cutting board. Also, magnet members can be seen selectively positioned throughout the cutting board to keep the covers in place. Also, the folding feature of the present invention can be appreciated.

Cutting board 22 contains various openings wherein a plurality of compartments 42 of compartment assembly 40 are housed, as seen in FIGS. 1 and 2. The openings can have various sizes such as substantially square, rectangular, hexagonal, triangular, etc. Additionally, cutting board 22 can include a plurality of magnets within the openings for the various compartments to engage complementing magnets on the compartments 42 or the compartment covers 44.

Compartment covers 44 can help define the cutting surface of cutting board 22 so that as they are removed, the cut food is allowed to fall directly into compartments 42. The magnets 50 are located along the frame of cutting board 22 and securely engage the corresponding magnets or other ferromagnetic members located at preselected areas of compartments 42 and/or compartment covers 44. Compartments 42 can be designed to include a lip, funnel, or other equivalent means understood by one of ordinary skill in the art to allow the stored food to be easily transferred without spillage. Cutting board 22 can include openings 24 along at least one side wall that allows compartments 42 to be slid in and out of position as a user requires. In an operating environment, a user can be chopping food on one or more areas of the cutting board over the compartment covers 44 and then upon removing compartment covers 44 the cut food falls into at least one compartment 42. Thereupon, a user can slide compartments 42 out through openings 24. Optionally, the food can all be stored in compartments 42 and be transferred all at once since the compartments are sealed using compartment covers 44. In fact, the cutting board 22 can be folded while the food is within compartments 44 and transported that way.

As seen in FIG. 1, knife assembly 60 includes slits 62 along at least one side wall of cutting board 22 that allow knives K to be inserted therein and at least partially housed within cutting board assembly 20. The slits 62 can be located below or above compartments 44. Upon folding cutting board 22, the present invention can take on a knife block configuration thereby allowing a user to stand and/or showcase the knife set. For added safety, the knives can be ferromagnetically held within the slits 62 using magnets so that they do not easily slide out during use or transport.

In one embodiment, cutting board 22 includes at least one lid 26 that can be located substantially in the center of the cutting board. The lid 26 when removed from cutting board 22 creates a throughhole that cut food can pass through since there will be no bottom surface to the cutting board 22 under lid 26. In one embodiment, lid 26 can include side walls so that it can also be installed through the bottom of the cutting board 22 and used as a compartment 44.

Lid 26 can be elevated by a user so that it hovers over cutting board 22 and can be supported using pins, rods or similar suited supporting means readily known in the art. Cutting board assembly 20 includes a frame 28 that provides support and stability for the cutting surface. Compartments 44 and lid 26 are all designed around frame 28. In an embodiment, lid 26 can include a handle to allow a user to remove from cutting board 22. The handle can be manually flipped up using hinged means or the handle can include spring-loaded means that partially and upwardly ejects the handle upon a user pushing down against the spring means. The handle is ejected sufficiently so that a user can ergonomically grasp the handle and remove lid 26.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A cutting board, comprising: a frame having an interior space defined by a thickness of said frame, said frame having perimeter side walls, four compartments within said interior space, at least one slot located on at least one of said perimeter side walls adapted to allow said at least one of said four compartments to enter and be removed from said interior space, each of the said four compartments is covered by a slidable surface top that is removably mounted to the frame, each of said four compartments further including a first, second, third, and fourth sidewall, said first and second sidewall including openings that together form a funnel opening at a corner of each of said four compartments, and a lid centrally located at the intersection of said four compartments, said lid covering a throughhole that extends through the thickness of said frame, said throughhole adapted to allow users to pass objects therein and drop them onto a predetermined location.

2. The cutting board of claim 1 wherein said lid is mounted to said top surface using magnets.

3. The cutting board of claim 1 wherein said frame has a cross like frame defining four quadrants, each of said four quadrants includes a compartment and a corresponding said slidable surface top, said frame includes perimeter side walls, an amount of slots located at said sidewalls that cooperate with sliding out each said compartment.

4. The cutting board of claim 3 wherein each of said slidable surface top is removably mounted to the frame using magnets, said frame having a plurality of first magnets in each quadrant, each of said slidable surface tops include a plurality of second magnets configured to interact with said first magnets to securely engage said slidable surface tops to said frame.

5. The cutting board of claim 1 wherein said throughhole has a top opening, said lid is flush with said top opening.

6. The cutting board of claim 1 wherein said compartments have an opening at one corner adapted to help funnel food out of said compartments, said compartments having four side walls each having a height adapted to keep objects within said compartments from spilling unintentionally.

7. The cutting board of claim 1 wherein said throughhole is circular, rectangular, square, triangular, star-shaped or polygonal shaped.

8. The cutting board of claim 1 wherein additional slots are located on at least one perimeter wall and is adapted to receive a utensil.

9. The cutting board of claim 1 wherein said compartments have sides, at least one side having a handle mounted thereon and facing outwardly.

10. The cutting board of claim 1 wherein said lid is mounted on said frame using a tongue and groove fastening system.

11. The cutting board of claim 1 being foldable along the center of said frame.

12. The cutting board of claim 1 wherein said compartments are separated from each other using a partition that is integral with the frame.

13. A cutting board, comprising:
   a. a surface assembly including a frame having a rear sidewall, a front sidewall, and two lateral sidewalls, said frame including an outer perimeter, said outer perimeter including four slots;
   b. a compartment assembly including four compartment trays inserted through one of said four slots to be entirely within said outer perimeter of said frame;
   c. said surface assembly further including a substantially cross-shaped partition member that separates said four compartment trays;
   d. said four compartment trays each including a tray lid that is removably mounted to said cross-shaped partition member, said tray lid acts as a top surface of said surface assembly adapted to allow a user to chop and prepare food on the tray lid; and
   e. each of said four compartment trays further including a first, second, third, and fourth sidewall, said first and second sidewall including openings that together form a funnel opening at a corner of each of said four compartment trays adapted to allow a user to funnel food through the funnel, said funnel opening having a radius of curvature.

14. The cutting board of claim 13 further including a lid assembly having a removable lid that creates a throughhole in said surface assembly adapted to allow food to pass through the funnel.

15. The cutting board of claim 14 wherein said removable lid is removably mounted to said cross-shaped partition member using magnets.

16. The cutting board of claim 14 wherein said removable lid has a substantially circular shape that includes a thickness equal to the thickness of said surface assembly.

17. The cutting board of claim 14 wherein said removable lid has an outer circumference, said throughhole including an inner circumference that is lined by ferromagnetic members that cooperate with magnet members that extend along the removable lid's outer circumference.

\* \* \* \* \*